United States Patent
Grover et al.

(10) Patent No.: US 12,423,700 B2
(45) Date of Patent: Sep. 23, 2025

(54) MANAGING SMART CONTRACTS USING A DISTRIBUTED LEDGER

(71) Applicant: MICRO FOCUS LLC, Wilmington, DE (US)

(72) Inventors: Douglas Max Grover, Rigby, ID (US); Michael F. Angelo, Houston, TX (US)

(73) Assignee: Micro Focus LLC, Wilmington, DE (US)

( * ) Notice: Subject to any disclaimer, the term of this patent is extended or adjusted under 35 U.S.C. 154(b) by 88 days.

(21) Appl. No.: 18/402,547

(22) Filed: Jan. 2, 2024

(65) Prior Publication Data

US 2025/0217805 A1 Jul. 3, 2025

(51) Int. Cl.
*G06Q 20/40* (2012.01)
*G06Q 20/02* (2012.01)
*G06Q 20/38* (2012.01)

(52) U.S. Cl.
CPC ......... *G06Q 20/4014* (2013.01); *G06Q 20/02* (2013.01); *G06Q 20/3829* (2013.01)

(58) Field of Classification Search
None
See application file for complete search history.

(56) References Cited

U.S. PATENT DOCUMENTS

| | | | |
|---|---|---|---|
| 10,277,398 B2 | 4/2019 | Weimer et al. | |
| 10,476,879 B2 * | 11/2019 | Bathen | H04L 9/30 |
| 11,277,261 B2 * | 3/2022 | Angelo | H04L 9/3239 |
| 2018/0204191 A1 * | 7/2018 | Wilson | H04L 9/30 |
| 2020/0089895 A1 | 3/2020 | Gollogly | |
| 2020/0201843 A1 * | 6/2020 | Irazabal | G06F 16/2379 |
| 2022/0020003 A1 * | 1/2022 | Sarkar | H04L 9/3247 |
| 2023/0328050 A1 | 10/2023 | Grover et al. | |
| 2024/0265001 A1 * | 8/2024 | Fatahi | G06F 16/27 |
| 2025/0037120 A1 * | 1/2025 | Kaplan | G06Q 20/3829 |

FOREIGN PATENT DOCUMENTS

| | | |
|---|---|---|
| CN | 110765210 | 9/2022 |
| CN | 113242230 | 9/2022 |

OTHER PUBLICATIONS

Mahmoud Tayseer Al Ahmed et. al., "Authentication-Chains: Blockchain-Inspired Lightweight Authentication Protocol for IoT Networks", 2023 (Year: 2023).*

* cited by examiner

*Primary Examiner* — Neha Patel
*Assistant Examiner* — Timothy Paul Sax
(74) *Attorney, Agent, or Firm* — Sheridan Ross P.C.

(57) ABSTRACT

A blockchain is created. The blockchain comprises an authentication block that defines one or more authentication credentials that are required to be provided by an endorser to add a first type of transaction block to the blockchain. For example, a user may be required to provide a username/password to add a smart contract transaction block to the blockchain. A request to add the first type of transaction block to the blockchain is received. The first type of transaction block is added to the blockchain. Adding the first type of transaction block to the blockchain is based on the endorser providing the one or more authentication credentials.

15 Claims, 9 Drawing Sheets

MANAGING SMART CONTRACTS USING A DISTRIBUTED LEDGER

FIELD

The disclosure relates generally to managing information using a distributed ledger/blockchain and particularly to managing smart contracts using a distributed ledger/blockchain.

BACKGROUND

With distributed ledger/blockchain technology, the distributed ledger/blockchain can be attacked in different ways to create invalid blocks in the blockchain. For example, a consensus attack may be used to add a malicious/falsified block to the blockchain. Because of the immutability of the distributed ledger/blockchain, it is difficult to deal with malicious/falsified blocks.

SUMMARY

These and other needs are addressed by the various embodiments and configurations of the present disclosure. The present disclosure can provide a number of advantages depending on the particular configuration. These and other advantages will be apparent from the disclosure contained herein.

A blockchain is created. The blockchain comprises an authentication block that defines one or more authentication credentials that are required to be provided by an endorser to add a first type of transaction block to the blockchain. For example, a user may be required to provide a username/password to add a smart contract transaction block to the blockchain. A request to add the first type of transaction block to the blockchain is received. The first type of transaction block is added to the blockchain. Adding the first type of transaction block to the blockchain is based on the endorser providing the one or more authentication credentials.

The phrases "at least one", "one or more", "or," and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The terms "determine," "calculate" and "compute," and variations thereof, as used herein, are used interchangeably, and include any type of methodology, process, mathematical operation, or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "blockchain" as described herein and in the claims refers to a growing list of records, called blocks, which are linked using cryptography. The blockchain is commonly a decentralized, distributed and public digital ledger that is used to record transactions across many computers so that the record cannot be altered retroactively without the alteration of all subsequent blocks and the consensus of the network. Each block contains a cryptographic hash of the previous block, a timestamp, and transaction data (generally represented as a merkle tree root hash). For use as a distributed ledger, a blockchain is typically managed by a peer-to-peer network collectively adhering to a protocol for inter-node communication and validating new blocks. Once recorded, the data in any given block cannot be altered retroactively without alteration of all subsequent blocks, which requires consensus of the network majority. In verifying or validating a block in the blockchain, a hashcash algorithm generally requires the following parameters: a service string, a nonce, and a counter. The service string can be encoded in the block header data structure, and include a version field, the hash of the previous block, the root hash of the merkle tree of all transactions (or information or data) in the block, the current time, and the difficulty level. The nonce can be stored in an extraNonce field, which is stored as the left most leaf node in the merkle tree. The counter parameter is often small at 32-bits so each time it wraps the extraNonce field must be incremented (or otherwise changed) to avoid repeating work. When validating or verifying a block, the hashcash algorithm repeatedly hashes the block header while incrementing the counter & extraNonce fields. Incrementing the extraNonce field entails recomputing the merkle tree, as the transaction or other information is the left most leaf node. The body of the block contains the transactions or other information. These are hashed only indirectly through the Merkle root.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

Figure 1:
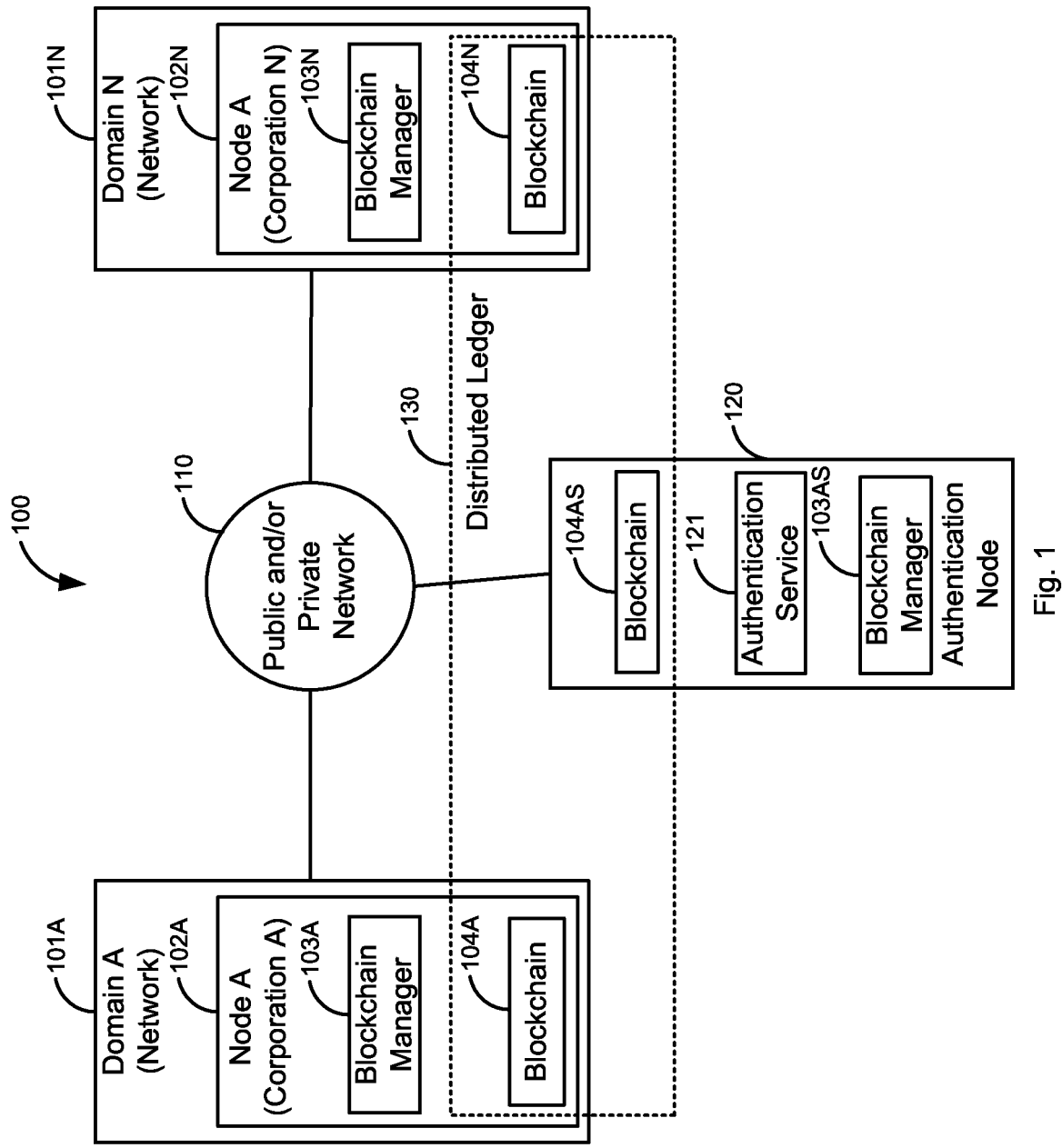
FIG. 1 is a block diagram of a first illustrative system for managing smart contracts using a distributed ledger.

FIG. 1 is a block diagram of a first illustrative system 100 for managing smart contracts using a distributed ledger 130. The first illustrative system 100 comprises domains 101A-101N, a network 110, an authentication node 120, and a distributed ledger 130.

The domains 101A-101N may be a network 110 associated with an entity. For example, the domains 101A-101N may be separate corporate networks, separate government networks, separate private networks, and/or the like. The domains 101A-101N may be domains 101 within the same corporate network/private network 110.

The domains 101A-101N further comprise nodes 102A-102N. The nodes 102A-102N are devices that have blockchains 104A-104N. The nodes 102A-102N may be any device/resource (e.g., a container/virtual machine) that can be used as part of the distributed ledger 130. The nodes 102A-102N comprises blockchain managers 103A-103N and the blockchains 104A-104N.

The blockchain managers 103A-103N/103AS are used to manage the addition of blocks to the blockchains 104A-104N/103AS. The blockchain managers 103A-103N/103AS also manage consensus voting for adding blocks to the blockchains 104A-104N.

The blockchains 104A-104N/104AS are copies of the same blockchain 104 that makeup the distributed ledger 130. The blockchains 104A-104N/104AS provide immutability of the data in the blockchain 104 because of the distributed nature of the distributed ledger 130.

The network 110 can be or may include any collection of communication equipment that can send and receive electronic communications, such as the Internet, a Wide Area Network (WAN), a Local Area Network (LAN), a packet switched network, a circuit switched network, a cellular network, a combination of these, and the like. The network 110 can use a variety of electronic protocols, such as Ethernet, Internet Protocol (IP), Hyper Text Markup Language (HTML), Hyper Text Transfer Protocol (HTTP), Web Real-Time Protocol (Web RTC), and/or the like. Thus, the network 110 is an electronic communication network configured to carry messages via packets and/or circuit switched communications.

The authentication node 120 is a node 120 that in one embodiment is part of the distributed ledger 130. The authentication node 120 is used to validate the authentication of users for adding blocks to the blockchains 104A-104N. The authentication node 120 comprises the blockchain 104AS, an authentication service 121, and a blockchain manager 103AS. The authentication node 120 may be owned by a third party that is managing the smart contract for the entities in the domains 101A-101N.

The blockchain 104AS is a copy of the blockchains 104A-104N in the distributed ledger 130. The blockchain 104AS is managed by the blockchain manager 103AS.

The authentication service 121 is used to validate authentication credentials for adding blocks to the blockchains 104A-104N and 104AS. For example, the authentication service 121 may validate a username and password for a user to add a receipt of shipment block to the blockchain 104 (a type of transaction block). The authentication credentials used for validation of the addition of transaction blocks may be any type of authentication credential, such as a username/ password, a fingerprint scan, an iris scan, a voiceprint, a security question, a Short Message Service (SMS) code, an email code, and/or the like.

The blockchain manager 103AS is similar to the authentication managers 103A-103N. The blockchain manager 103AS manages the addition of blocks into the blockchain 104AS.

The distributed ledger 130 comprises the blockchains 104A-104N and 104AS. The distributed ledger 130 may be distributed across a private network 110, a public network 110, a combination of these, and the like. The distributed leger 130 may comprise any number of nodes 102. For example, if there are ten parties to the smart contract, there may be ten nodes 102 along with the authentication node 120 that make up the distributed ledger 130.

In FIG. 1, each party to the smart contract maintains a copy of the blockchain 104 along with the authentication node 120. The authentication node 120/authentication service 121 may be provided by a party to the smart contract or by a third party as part of a smart contract service. If the network 110 is public or even private, known encryption schemes can be used to transport the blockchain transactions securely (e.g., using Transport Layer Security (TLS)). When the initial blockchain 104 is created, authentication requirements are added to the blockchain 104 via authentication blocks.

Figure 2:
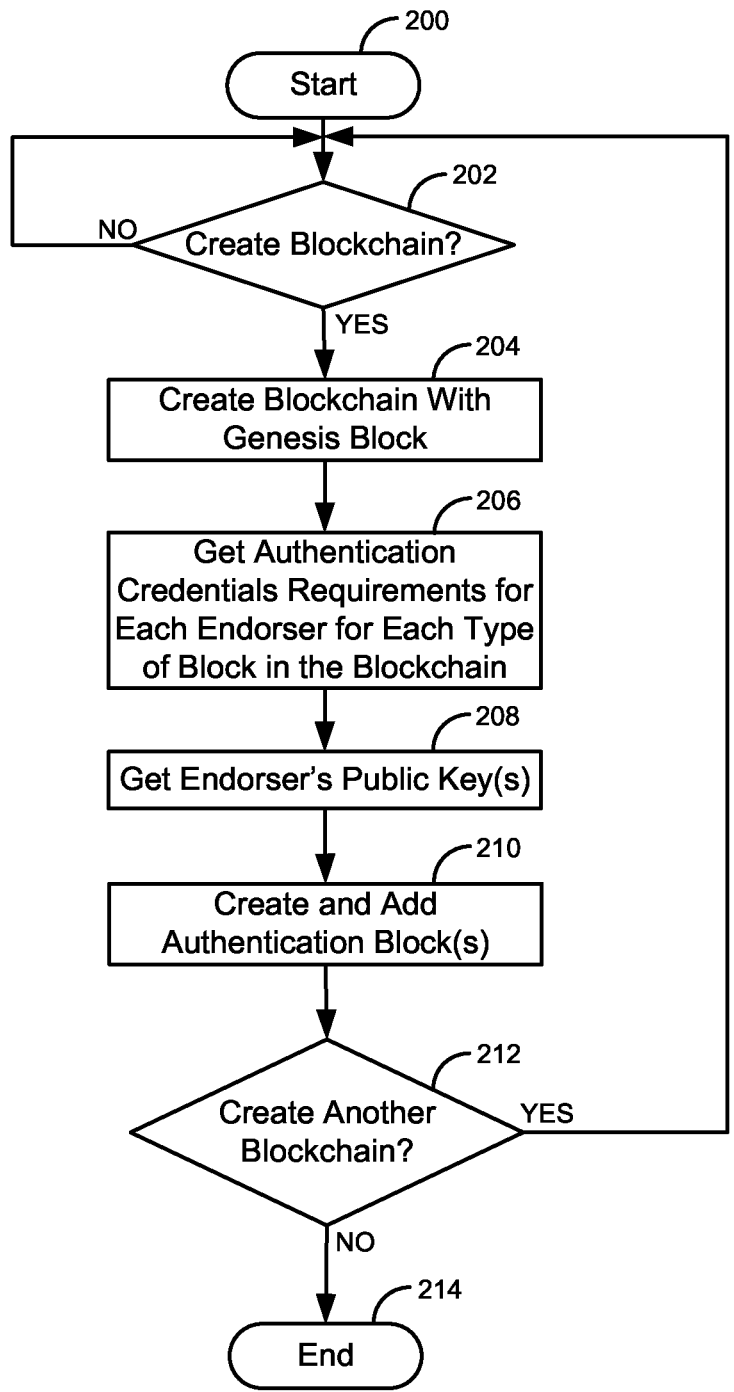
FIG. 2 is a flow diagram of a process for initially creating a blockchain for managing smart contracts.

FIG. 2 is a flow diagram of a process for initially creating a blockchain 104 for managing smart contracts. Illustratively, the domains 101A-101N, the nodes 102A-102N/120 the blockchain managers 103A-103N/103AS, the blockchains 104A-104N/104AS, the authentication node 120, and the authentication service 121 are stored-program-controlled entities, such as a computer or microprocessor, which performs the method of FIGS. 2-9 and the processes described herein by executing program instructions stored in a computer readable storage medium, such as a memory (i.e., a computer memory, a hard disk, and/or the like). Although the methods described in FIGS. 2-9 are shown in a specific order, one of skill in the art would recognize that the steps in FIGS. 2-9 may be implemented in different orders and/or be implemented in a multi-threaded environment. Moreover, various steps may be omitted or added based on implementation.

A smart contract may be any agreement/contract that is managed via the blockchain 104. The smart contract may be an agreement between different parties, individuals, companies, and/or the like. For example, a smart contract may be a purchase agreement between company A and company B. As part of the smart contract, individual users/groups are determined to approve/endorse each step of the smart contract.

In addition, a smart contract comprise anything used to track information. For example, the smart contract may comprise tracking the building of a software application, construction of a building (e.g., as a project management tool), tracking inventory, tracking products, tracking purchases, tracking usage of materials, tracking financial transactions, and/or the like.

To illustrate, consider the following example. The smart contract may be a contract to purchase 1,000 widgets. The smart contract may define a series of events associated with the purchase of the 1,000 widgets. For example, user A from company A and user B from company B may have to approve the smart contract. User C from company A approves when the 1,000 widgets are shipped. User D from company B approves when the 1,000 widgets are received/accepted. In this example, there three events/transactions. Approval of the smart contract, shipment of the 1,000 widgets, and receipt/acceptance of the 1,000 widgets.

For each event/transaction, there is a responsible user/group/entity that have to authenticate and endorse the transaction. Each transaction and/or transaction type may require different authentication credentials. For example, to approve the smart contract, the users A and B may both have to provide a username and password/fingerprint scan, for the shipment transaction, the user C may have to provide only a username and password, and for the receipt transaction, the user D may have to provide a username/password and a valid iris scan. This information is captured in the blockchains 104A-104N/104AS in order to manage the smart contract in the distributed ledger 130.

This starts the process of creating the blockchain 104 of FIG. 2. The process starts in step 200. The blockchain managers 103 determine, in step 202, if a blockchain 104 is to be created. If a blockchain 104 is not to be created in step 202, the process of step 202 repeats.

Otherwise, if a blockchain 104 is to be created in step 202, the blockchain managers 103A-103N/103AS create the blockchains 104A-104N/104AS by creating a genesis block in the blockchains 103A-103N/103AS in the distributed ledger 130 in step 204. The authentication manager 125 gets, in step 206, the authentication credential requirements for each user/group/entity (an endorser) for each type of transaction block in the blockchain 104A-104N/104AS. For example, as described in the example above, there are three transaction blocks: an add smart contract transaction block, a shipment transaction block, and a receipt transaction block. For the smart contract transaction block, users A and B have to provide username and password/fingerprint scan. For the shipment transaction block, user C has to provide a username and password. For the receipt block user D has to provide a username/password and an iris scan.

The blockchain managers 103A-103N/103AS get the endorser's public key(s) in step 208. The endorser's private key(s) are used to create the endorsement codes based on the endorsement block. The blockchain managers 103A-103N/103AS create and add the authentication block(s) (e.g., as described in FIG. 5) to the blockchains 104A-104N/104AS in the distributed ledger 130 in step 210 after validating the endorsement.

The authentication block(s) may include a block for each type of transaction block, may be a single block for all the transaction types, a combination of these, and/or the like. The authentication block(s) have the authentication credential requirements for each endorser for each type of transaction block, the endorser's public key(s), and any other information that may be needed.

The blockchain managers 103 determines, in step 212, if another blockchain 104 is to be created. For example, another blockchain 104 may be created for a second smart contract. If another blockchain 104 is to be created in step 212, the process goes back to step 202. Otherwise, if another blockchain 104 is not to be created in step 212, the process ends in step 214.

Figure 3:
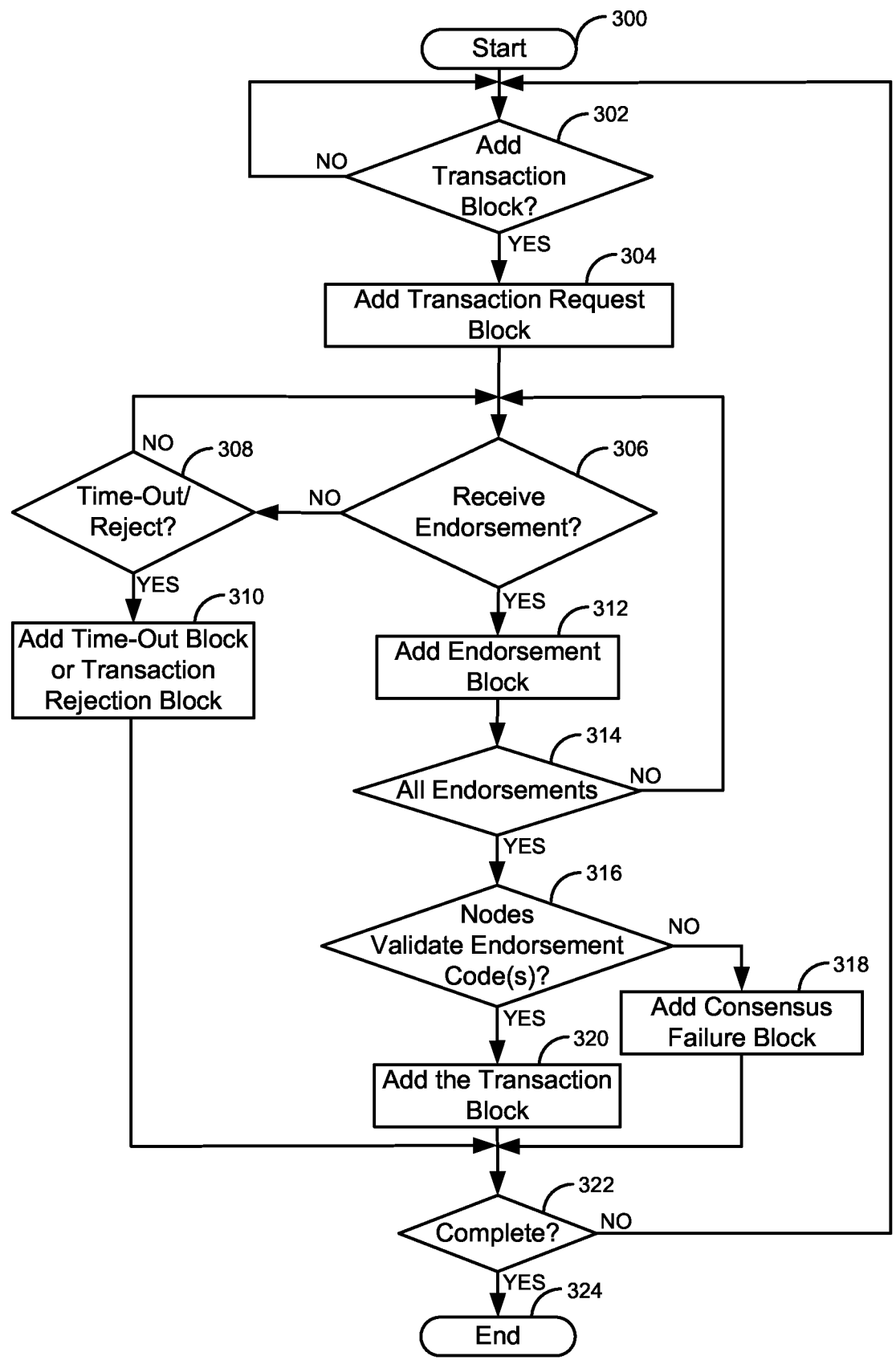
FIG. 3 is a flow diagram of a process for adding a transaction block to a blockchain based on receiving the proper endorsement(s) to add the transaction block to the blockchain.

FIG. 3 is a flow diagram of a process for adding a transaction block to a blockchain 104 based on receiving the proper endorsement(s) to add the transaction block to the blockchain 104. The process starts in step 300. The blockchain manager 103 determines, if a request to add a transaction block has been received in step 302. If a request to add a transaction block has not been received in step 302, the process of step 302 repeats.

Otherwise, if a request to add a transaction block has been received in step 302, the blockchain manager 103 adds, in step 304, a transaction request block to the blockchain 104. The transaction request block may contain various types of information, such as, the user requesting to add the transaction block, a date/time, a transaction block type, and/or the like. Step 304 may be optional based on implementation.

The blockchain manager 103 determines, in step 306, if an endorsement has been received. An endorsement is based on the user(s)/group(s)/entities that are defined in the authentication blocks properly authenticating and approving the transaction. If an endorsement has not been received in step 306, the blockchain manager 103 determines, if a time-out or a rejection of the transaction has been received in step 308. If a time-out or rejection has not been received in step 308, the process goes back to step 306 to wait for an endorsement. Otherwise, if a time-out or rejection has been received in step 308, the blockchain manager 103 adds a time-out block or a transaction rejection block in step 310 and the process goes to step 322.

If a proper endorsement has been received in step 306, an endorsement block is added to the blockchain 104 in step 312. The blockchain manager 103 determines, in step 314, if all the necessary endorsement(s) have been received. For example, if two endorsements are required, step 314 determines if both endorsements have been received (e.g., by looking at the added endorsement block(s)). If not all of the endorsement(s) have been received in step 314, the process goes back to step 306.

Otherwise, if all the endorsement(s) have been received in step 314, the nodes 102A-102N/120 validate the endorsement code(s) in step 316. For example, if there were two endorsement codes from user A and user B that are in two endorsement blocks, the nodes 102A-102N/120 would use the endorser's public key(s) that are stored in the authentication block(s) and use the public key(s) to verify that the endorsement codes are valid. If the nodes 102A-102N/120 do not validate all the endorsement code(s) in step 316, a consensus failure block is added to the blockchain 104 in step 318 and the process goes to step 322. Otherwise, if the nodes 102A-102N/120 validate the endorsement code(s) in step 316, the transaction block is added to the blockchain 104 in step 320.

The blockchain manager 103 determines, in step 322, if the process is complete. If the process is not complete in step 322, the process goes to step 302. Otherwise, if the process is complete in step 322, the process ends in step 324.

The process of FIG. 3 may work where a thread is spun off each time a transaction block is requested. This allows for the concurrent management of separate transaction requests.

Figure 4:
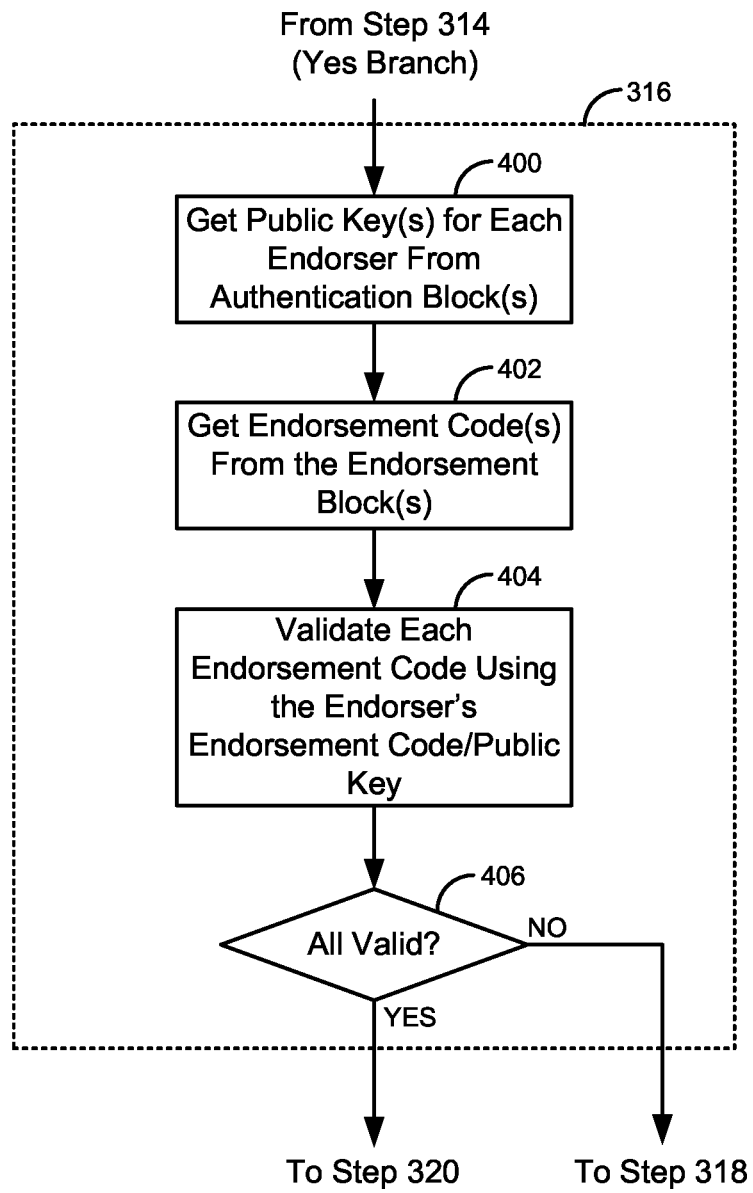
FIG. 4 is a flow diagram of validating endorsement codes using a public encryption key(s) of user(s) to validate the addition of a transaction block to a blockchain.

FIG. 4 is a flow diagram of validating endorsement codes using a public encryption key(s) of user(s)/entities to validate the addition of a transaction block to a blockchain 104. FIG. 4 is an exemplary embodiment of step 316 of FIG. 3. After all the required endorsements have been received in step 314, the blockchain managers 103 get the public key(s) of the users/entities from the authentication block(s) in step 400. The blockchain managers 103 get the endorsement code(s) from the endorsement blocks in step 402. The blockchain managers 103 validates each endorsement code(s) using the endorser's endorsement code/public key in step 404. This can be done by calculating the hash of the record, decrypting the hash (using the endorsers public key), and comparing the two hashes.

If all the endorsement code(s) are validated using the public key(s) in step 406, the process goes to step 320. Otherwise, if any one of the endorsement codes are not valid in step 406, the process goes to step 318.

Figure 5:
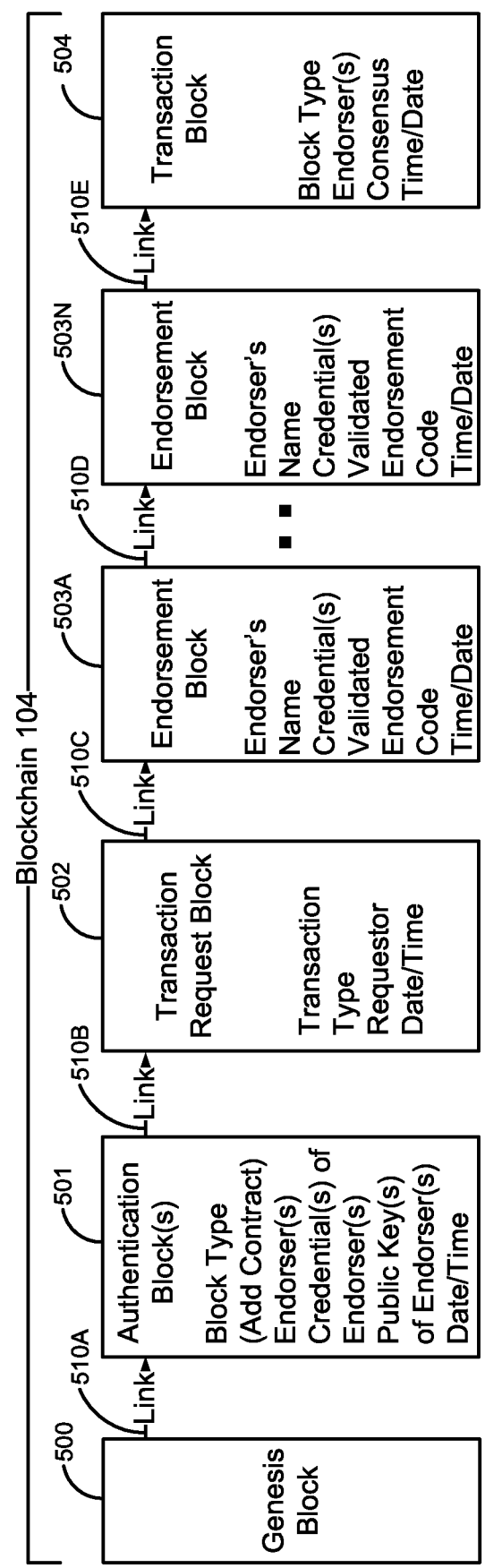
FIG. 5 is a diagram of a blockchain where a transaction block has been added to the blockchain.

FIG. 5 is a diagram of a blockchain 104 where a transaction block 504 has been added to the blockchain 104. The blockchain 104 comprises a genesis block 500, an authentication block(s) 501, a transaction request block 502, endorsement blocks 503A-503N and a transaction block 504. In addition, the blocks 500-504 are linked together by forward links 510A-510E. The links 510A-510E are links to hashes that are used to validate the blockchain 104 as is traditionally done in blockchains 104.

The genesis block 500 is created when the blockchain 104 is first created. Although not shown, the genesis block 500 may comprise additional information, such as, a creation date/time, a blockchain creator, a blockchain creation purpose, and/or the like.

The authentication block(s) 501 may be one or more blocks that contain information about the users/groups/entities who have to approve/endorse different types of transaction blocks 504. For example, if the blockchain 104 is for tracking a smart contract between two parties to purchase a product, the transaction block types may be: 1) an add contract transaction block 504 (approved by both parties), 2) a payment transaction block 504 (created by the payor), 3) a payment receipt transaction block 504 (created by the payee), 4) a shipment transaction block 504 (created by the shipper), and 5) a receipt transaction block 504 (created by the receiver). In addition, other types of transaction blocks 504 may include a transaction rejection block, a transaction revocation block, and/or the like.

The authentication block 501 may be a single block that has the information for all the users/groups/entities required to endorse each type of transaction block 504. Alternatively, instead of a single authentication block 501, there may be a single block for each type of transaction block 504. For example, for the smart contract described above, there may be five separate authentication blocks 501: one for the add contract transaction block type, one for the payment transaction block type, one for the payment receipt transaction block type, one for the shipment transaction block type, and one for the receipt transaction block type. Another option may be to combine some of the types of transaction types into different authentication blocks 501.

The authentication block(s) 501 comprises a block type identifier (e.g., an add contract transaction block type), an endorser(s) (e.g., the endorser's name), authentication credentials required by the endorser(s) (e.g., a username/password and fingerprint scan) to approve the addition of the transaction block type, a public encryption key of the endorser(s), a date/time, and/or the like. The authentication block(s) may have email addresses/phone numbers of the endorser(s). The authentication block(s) 501 are typically added to the blockchain 104 when the blockchain 104 is initially created.

The transaction request block 502 is added to the blockchain 104 when a request to add a transaction block 504 is made (e.g., in step 304 of FIG. 3). To start the process that eventually adds the transaction block 504, the user/entity may be presented with a menu of the types of transaction blocks that can be added for this particular stage of the contract. For example, the user/entity may be presented with the option to add a contract to the blockchain 104 (a contract transaction block 504). Upon doing so, the transaction request block 502 is added to the blockchain 104.

The transaction request block 502 comprises a transaction type (e.g., add contract), a requestor (e.g., who requested to add the transaction block 504), a data/time (when the transaction block 504 was added to the blockchain 104), and/or the like. When the transaction request block 502 is added, based on the transaction block type, a notification (e.g., an email or text message) may be sent to the endorser(s) based on the endorser(s) defined in the authentication block 501 for that transaction block type. For example, if the transaction block type being added is to be an add smart contract transaction block 504, the blockchain managers 103 can look at the authentication block 501 to identify what endorser(s) are required to add a smart contract transaction block 504 to the blockchain 104. The endorser(s) are then notified (e.g., via an email). The notification may indicate which authentication credentials are required.

The endorser(s) then authenticate using the authentication service 121 and provide the authentication credentials defined in the authentication block 501. The authentication credentials may be different based on the endorser (depending on what is defined in the authentication block(s) 501). For example, user A may be required to provide two authentication credential (e.g., username/password/Short Message Service (SMS) code) and user B may be only required to provide a single authentication factor (e.g., a fingerprint scan). Each type of transaction block 504 may require different authentication credential(s) or the same authentication credentials. Once the endorser has provided the correct authentication credentials and approved the transaction, the endorsement block 503A is added to the blockchain 104. This process is repeated for each of the endorsers until all endorsers have properly authenticated and approved the transaction, which results in in the addition of the endorsement block 503N. In this example, the endorsement blocks 503A-503N have the endorser's name, the authentication credentials validated, an endorsement code of the user/entity, and a date/time.

Once all the required endorsement blocks 503A-503N have been added to the blockchain 104, the transaction block 504 is added to the blockchain 104 based on all the nodes 102A-102N/120 approving the transaction (having a 100% consensus) by validating each of the endorsement code(s) in the endorsement block(s) 503. The 100% consensus is different from traditional blockchains 104 where there only has to be a majority of the nodes 102A-102N/120 to approve a transaction. In one embodiment, only the nodes 102A-102N approve the transaction. In this embodiment, the authentication node 120 does not participate in the consensus vote. The transaction block 504 includes a block type (e.g., add smart contract), the endorser(s), a consensus time/date (when the nodes 102A-102N/120 approved the endorsement code(s)), and/or the like. The process of adding a transaction request block(s) 502, endorsement block(s) 503, and transaction block(s) 504 is repeated for each transaction block 504 that is added to the blockchain 104. For example, if a shipment transaction block 504 is to be added, the process of adding a second the transaction request block 502, additional endorsement block(s) 503, and the second transaction block 504 is repeated.

In one embodiment, the authentication block 501 may indicate that a specific type of transaction block 504 may not need to be endorsed. In this example, the transaction block 504 would be added to the blockchain 104 when the transaction is requested (i.e., there would be no transaction request block 502, and endorsement block(s) 503 for that type of transaction block 504).

Figure 6:
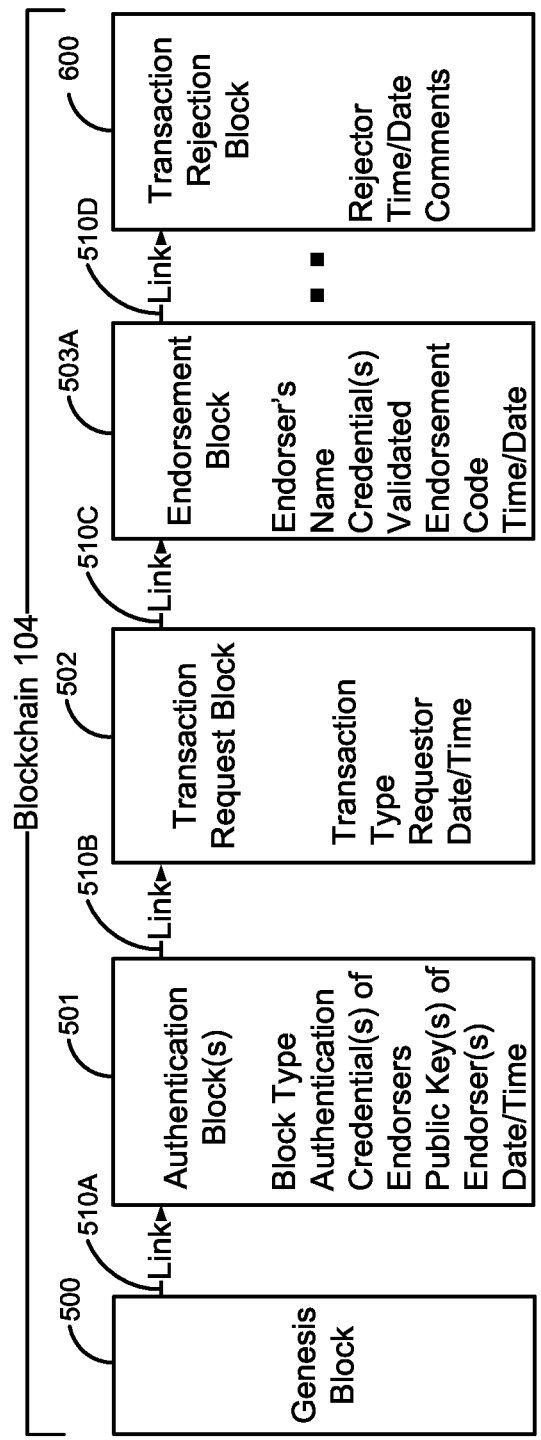
FIG. 6 is a diagram of a blockchain where a transaction request was rejected.

FIG. 6 is a diagram of a blockchain 104 where a transaction request was rejected. The blockchain 104 of FIG. 6 comprises the genesis block 500, the authentication block(s) 501, the transaction request block 502, the endorsement block 503A, and a transaction rejection block 600. The blockchain 104 of FIG. 6 is the same as the blockchain 104 of FIG. 5 up to the endorsement block 503A. However, instead of having the endorsement block 503N like in FIG. 5, one of the endorsers has rejected the transaction. This results in the addition of the transaction rejection block 600 instead of the endorsement block 503N. The transaction rejection block 600 may include information, such as who rejected the transaction (e.g., a name), a time/date, comments (e.g., why the transaction was rejected), and/or the like. Because the transaction was rejected, there is no transaction block 504 in the blockchain 104 of FIG. 6.

Figure 7:
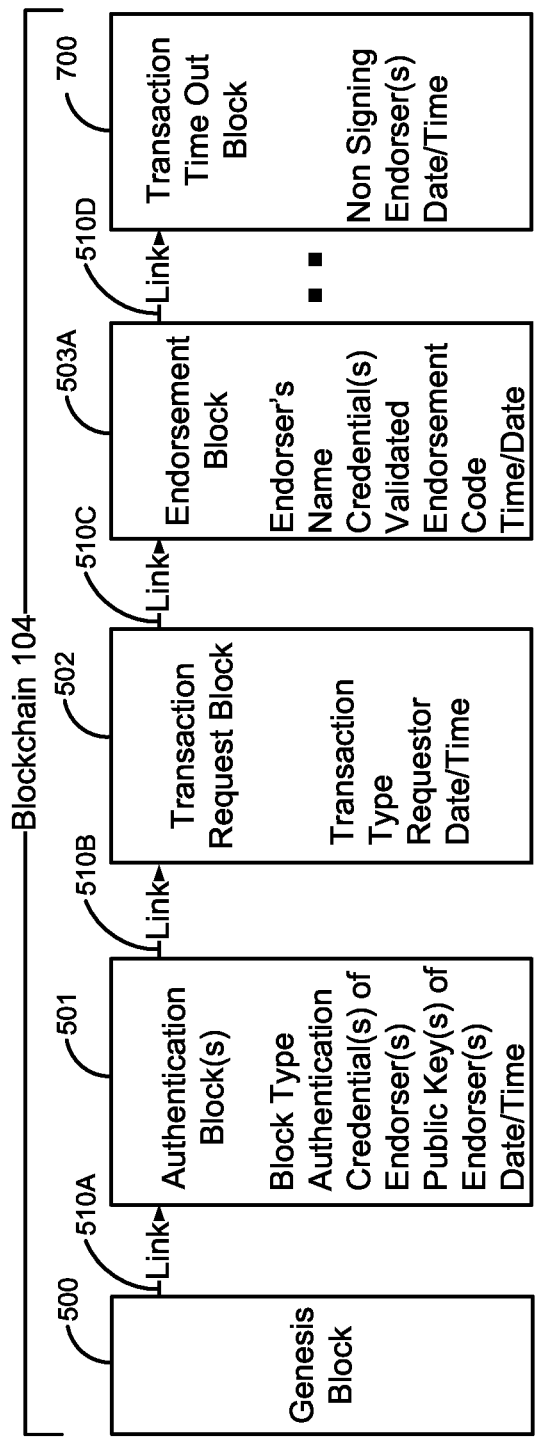
FIG. 7 is a diagram of a blockchain where a transaction request timed out.

FIG. 7 is a diagram of a blockchain 104 where a transaction request timed out. The blockchain 104 of FIG. 7 comprises the genesis block 500, the authentication block(s) 501, the transaction request block 502, the endorsement block 503A, and a transaction time out block 700. The blockchain 104 of FIG. 7 is the same as the blockchain 104 of FIG. 5 up to the endorsement block 503A. However, instead of having the endorsement block 503N like in FIG. 5, the endorser did not endorse the transaction within the approval time period. This results in the addition of the transaction time out block 700 instead of the endorsement block 503N. The transaction time out may include information such as, the non-signing endorser(s), a date/time, and/or the like. Because the transaction timed out, there is no transaction block 504 in the blockchain 104 of FIG. 7.

Figure 8:
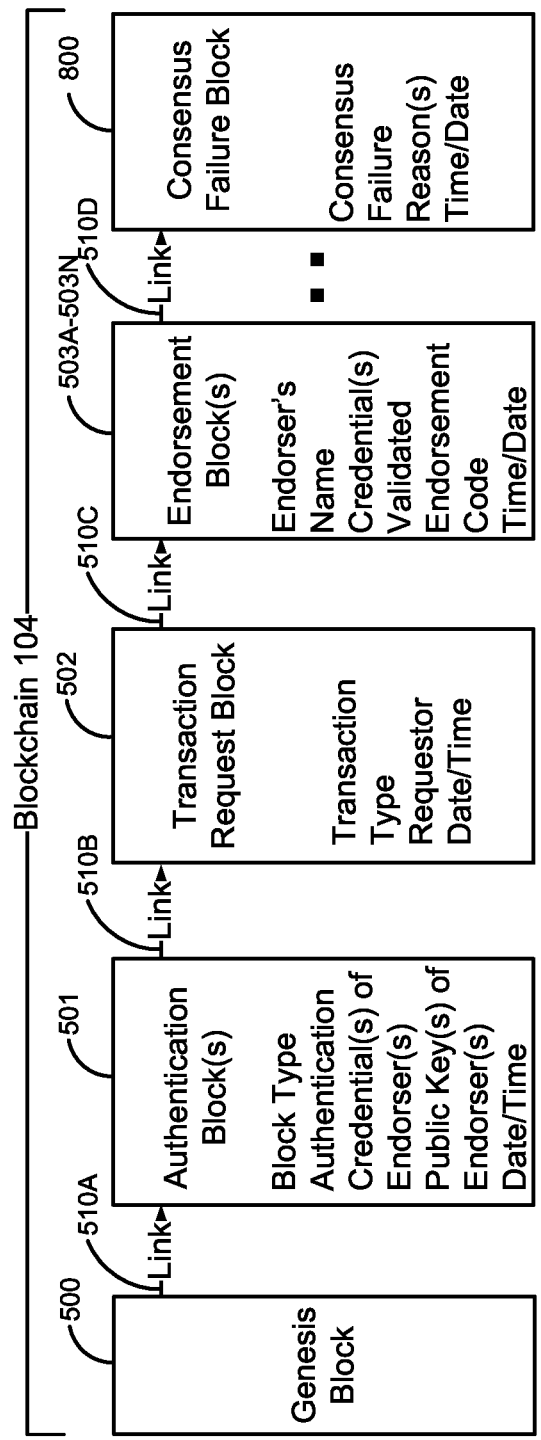
FIG. 8 is a diagram of a blockchain where a transaction request was rejected based on a consensus failure.

FIG. 8 is a diagram of a blockchain 104 where a transaction request was rejected based on a consensus failure. The blockchain 104 of FIG. 8 comprises the genesis block 500, the authentication block(s) 501, the transaction request block 502, the endorsement blocks 503A-503N, and a consensus failure block 800. The blockchain 104 of FIG. 7 is the same as the blockchain 104 of FIG. 5 up to the endorsement block 503N. In FIG. 8, the consensus vote failed. The consensus vote fails because one or more of the endorsement code(s) in the endorsement blocks 503A-503N were not validated (e.g., as described in step 316 of FIG. 3) by each of the nodes 102A-102N/120. This results in the addition of the consensus failure block 800. The consensus failure block 800 indicates which node(s) 102A-102N/120 failed to validate which endorsement code(s). In addition, the consensus block 800 may include reason information (details on why the validation failed), time/date information, and/or the like. In one embodiment, there may be multiple consensus failure blocks 800, one for each node 102A-102N/120 that did not validate the endorsement code(s). Because the consensus vote failed, there is not a transaction block 504 in the blockchain 104 of FIG. 8.

For FIGS. 6-8, the same transaction may be requested again by making a second transaction request. If approved correctly, a second transaction request block 502, a second set of endorsement blocks 503A-503N, and the transaction block 504 would be added to the end of the blockchains 104 of FIGS. 6-8.

Figure 9:
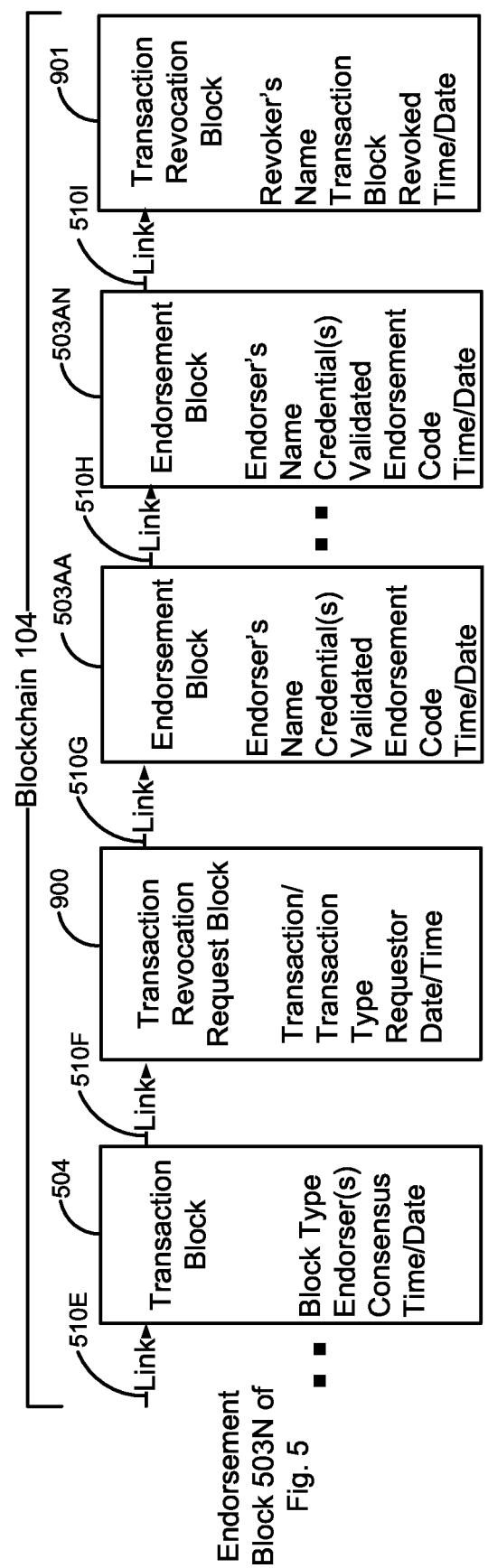
FIG. 9 is a diagram of a blockchain where a transaction was rejected based on a revocation.

FIG. 9 is a diagram of a blockchain 104 where a transaction was rejected based on a revocation. The blockchain 104 of FIG. 9 is a continuation of the blockchain 104 of FIG. 5. The blockchain 104 of FIG. 9 comprises the transaction block 504, a transaction revocation request block 900, an endorsement block 503AA, an endorsement block 503AN, and a transaction revocation block 901. The transaction block 504 is the same transaction block 504 of FIG. 5. The blocks 504, 900, 502AA, 502AN, and 901 are linked together by links 510E-510I.

An endorser has requested to revoke the transaction associated with the transaction block 504 (or it could be associated with any previous transaction block 504 in the blockchain 104). This results in the addition of transaction revocation request block 900. The transaction revocation request block 900 may include information, such as the specific transaction/transaction type, a requestor (e.g., the name of the person requesting the revocation), a transaction block identifier, a date/time, and/or the like.

Based on the required information in the authentication blocks 501, the endorsers provide the required authentication credentials/approvals, which results in the addition of the endorsement blocks 503AA-503AN. Once all the required authentication credential(s)/approval(s) are provided, the transaction revocation block 901 is added to the blockchain 104 of FIG. 9. The transaction revocation block 901 may include the revoker's name, a time/date, transaction block 504 being revoked, and/or the like.

As would be expected, various combinations of the blockchains 104 of FIGS. 5-9 may be created based on how the smart contract is managed. Moreover, combinations of the blockchains 104 of FIGS. 5-9 may be intermixed within the blockchain 104. For example, two transaction request blocks 502 may be added to the blockchain 104 before any of the endorsement blocks 503 are received for either transaction.

In addition, process described above may be used by software development for checking in components, approvals for a new releases of software, for financial transactions, for purchase order approvals, for notarization services, for supply chain tracking, for copyright data management, for governmental services, for other contracts, and/or the like.

In one embodiment, the process may work where each node 102A-102N/120 is owned by the same entity. In this example, the authentication service may manage the overall process.

The processes of adding blocks (other than the consensus failure block) may be implemented without using a distributed ledger 130. For example, a single blockchain 104 may be used instead of the replicated distributed ledger 130.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Any of the steps, functions, and operations discussed herein can be performed continuously and automatically.

However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system comprising:
a microprocessor; and
a computer readable medium, coupled with the microprocessor and comprising microprocessor readable and executable instructions that, when executed by the microprocessor, cause the microprocessor to:
create a blockchain, wherein the blockchain comprises an authentication block that defines one or more endorsers, a public key of each of the one or more endorsers, and one or more required authentication credentials that are required to be provided by each of the one or more endorsers to add a first type of transaction block to the blockchain;
receive a request to add the first type of transaction block to the blockchain;
receive an endorsement from each of the one or more endorsers of the authentication block;
add an endorsement block to the blockchain for each endorsement received from the one or more endorsers, wherein each endorsement block includes an endorsement code created using a private key of the endorser from which the endorsement was received;
validate the endorsement code of each of the one or more endorsers using the public key of each of the one or more endorsers included in the authentication block; and
add the first type of transaction block to the blockchain in response to the endorsement code of each endorsement being validated.

2. The system of claim 1, wherein validating the endorsement code of the endorser stored in the endorsement block in the blockchain is based on a consensus vote of a plurality of nodes in a distributed ledger.

3. The system of claim 1, wherein the microprocessor readable and executable instructions further cause the microprocessor to:
in response to receiving the request to add the first type of transaction block to the blockchain, add a transaction request block to the blockchain.

4. The system of claim 1, wherein the blockchain is for a smart contract for a plurality of entities, wherein the blockchain is part of a distributed ledger, and wherein each entity of the plurality of entities owns at least one node of a plurality of nodes in the distributed ledger.

5. The system of claim 1, wherein the authentication block defines a plurality of required authentication credentials for a plurality of different types of transaction blocks.

6. The system of claim 1, wherein the authentication block comprises a plurality of authentication blocks, one for each of a plurality of different types of transaction blocks.

7. The system of claim 1, wherein the blockchain comprises at least one of: an endorsement block, a consensus failure block, an endorsement time-out block, and a transaction rejection block.

8. The system of claim 1, wherein the blockchain comprises a transaction revocation request block and a transaction revocation block.

9. A method comprising:
creating, by a microprocessor, a blockchain, wherein the blockchain comprises an authentication block that defines one or more endorsers, a public key of each of the one or more endorsers, and one or more required authentication credentials that are required to be provided by each of the one or more endorsers to add a first type of transaction block to the blockchain;
receiving a request to add the first type of transaction block to the blockchain;
receiving an endorsement from each of the one or more endorsers of the authentication block;
adding an endorsement block to the blockchain for each endorsement received from the one or more endorsers, wherein each endorsement block includes an endorsement code created using a private key of the endorser from which the endorsement was received;
validating the endorsement code of each of the one or more endorsers using the public key of each of the one or more endorsers included in the authentication block; and
adding the first type of transaction block to the blockchain in response to the endorsement code of each endorsement being validated.

10. The method of claim 9, wherein validating the endorsement code of the endorser stored in the endorsement block in the blockchain is based on a consensus vote of a plurality of nodes in a distributed ledger.

11. The method of claim 9, further comprising:
in response to receiving the request to add the first type of transaction block to the blockchain, adding a transaction request block to the blockchain.

12. The method of claim 9, wherein the blockchain is for a smart contract for a plurality of entities, wherein the blockchain is part of a distributed ledger, and wherein each entity of the plurality of entities owns at least one node of a plurality of nodes in the distributed ledger.

13. The method of claim 9, wherein the authentication block defines a plurality of required authentication credentials for a plurality of different types of transaction blocks.

14. The method of claim 9, wherein the blockchain comprises at least one of: an endorsement block, a consensus failure block, an endorsement time-out block, a transaction rejection block, a transaction revocation request block and a transaction revocation block.

15. A non-transient computer readable medium having stored thereon instructions that cause a microprocessor to execute a method, the method comprising instructions to:
create a blockchain, wherein the blockchain comprises an authentication block that defines one or more endorsers, a public key of each of the one or more endorsers, and one or more required authentication credentials that are required to be provided by each of the one or more endorsers to add a first type of transaction block to the blockchain;
receive a request to add the first type of transaction block to the blockchain;
receive an endorsement from each of the one or more endorsers of the authentication block;
add an endorsement block to the blockchain for each endorsement received from the one or more endorsers, wherein each endorsement block includes an endorsement code created using a private key of the endorser from which the endorsement was received;
validate the endorsement code of each of the one or more endorsers using the public key of each of the one or more endorsers included in the authentication block; and
add the first type of transaction block to the blockchain in response to the endorsement code of each endorsement being validated.

\* \* \* \* \*